US009392084B2

(12) United States Patent
Firley (10) Patent No.: US 9,392,084 B2
(45) Date of Patent: Jul. 12, 2016

(54) RECOVERY OF A NETWORK INFRASTRUCTURE TO FACILITATE BUSINESS CONTINUITY

(71) Applicant: INTERNATIONAL BUSINESS MACHINES CORPORATION, Armonk, NY (US)

(72) Inventor: Mark J Firley, Gaithersburg, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 251 days.

(21) Appl. No.: 14/148,134

(22) Filed: Jan. 6, 2014

(65) Prior Publication Data

US 2015/0193317 A1 Jul. 9, 2015

(51) Int. Cl.
*G06F 11/00* (2006.01)
*H04L 29/14* (2006.01)

(52) U.S. Cl.
CPC .................................. *H04L 69/40* (2013.01)

(58) Field of Classification Search
USPC .......................................................... 714/4.1
See application file for complete search history.

(56) References Cited

U.S. PATENT DOCUMENTS

| | | | | |
|---|---|---|---|---|
| 6,070,244 A * | 5/2000 | Orchier | ............... | G06F 21/6218 709/223 |
| 6,536,037 B1 * | 3/2003 | Guheen | ..................... | G06F 8/71 703/2 |
| 6,606,744 B1 * | 8/2003 | Mikurak | ................. | H04L 29/06 717/174 |
| 6,636,988 B1 | 10/2003 | Firley et al. | | |
| 6,671,818 B1 * | 12/2003 | Mikurak | ................. | G06Q 10/06 714/4.21 |
| 8,266,327 B2 | 9/2012 | Kumar et al. | | |
| 8,938,727 B2 * | 1/2015 | Asipov | .................. | G06F 21/125 717/140 |
| 2002/0124070 A1 * | 9/2002 | Pulsipher | ............ | H04L 41/0663 709/223 |
| 2003/0115080 A1 * | 6/2003 | Kasravi | ................... | G06F 17/27 715/254 |
| 2005/0240840 A1 * | 10/2005 | Taylor | ...................... | H04B 1/74 714/724 |
| 2009/0119662 A1 * | 5/2009 | Fangmeier | ................ | G06F 8/60 717/176 |
| 2009/0198954 A1 * | 8/2009 | Sanders | ............ | G06F 17/30241 711/212 |
| 2009/0319649 A1 * | 12/2009 | Larsen | ................ | H04L 41/0846 709/222 |
| 2010/0332132 A1 * | 12/2010 | Okude | ............... | G01C 21/3476 701/414 |
| 2012/0198023 A1 | 8/2012 | Geist | | |
| 2013/0013727 A1 * | 1/2013 | Walker | .................. | H04W 4/003 709/217 |
| 2013/0030692 A1 * | 1/2013 | Hagan | .................... | G01C 21/32 701/410 |
| 2013/0232152 A1 * | 9/2013 | Dhuse | ............... | G06F 17/30321 707/741 |
| 2014/0081475 A1 * | 3/2014 | Dorofeev | ............... | G05B 15/02 700/292 |
| 2014/0330616 A1 * | 11/2014 | Lyras | ................. | G06Q 10/0635 705/7.28 |

(Continued)

OTHER PUBLICATIONS

Kern, RF. et al., "IBM Storage Infrastructure for Business Continuity" Jan. 2010, 62 pages.

(Continued)

*Primary Examiner* — Kamini Patel
(74) *Attorney, Agent, or Firm* — Matthew Chung; Andrew M. Calderon; Roberts, Mlotkowski, Safran & Cole PC (57) ABSTRACT

Methods and systems for disaster recovery of a network infrastructure to facilitate business continuity. A method including capturing, by at least one computer device, data and ecology information about an entire existing network infrastructure. The method further including generating, by the at least one computer device, a generalized descriptive language for the captured data and ecology information. The method further including reconstructing, by the at least one computer device, the entire existing network infrastructure by introducing functionally equivalent components that correspond to the generalized descriptive language.

16 Claims, 5 Drawing Sheets

(56) References Cited

U.S. PATENT DOCUMENTS

2014/0372458 A1* 12/2014 Jurca ................. G06F 17/30867
          707/754
2015/0227404 A1* 8/2015 Rajagopal ............. G06F 11/079
          714/37

OTHER PUBLICATIONS

Guendert, S. Dr. et al., "Enhanced Data Availability and Business Continuity with the IBM Virtual Engine TS7700 and Brocade Integrated Network Grid Solution" 2012, 1-22 pages.

* cited by examiner

RECOVERY OF A NETWORK INFRASTRUCTURE TO FACILITATE BUSINESS CONTINUITY

FIELD OF THE INVENTION

The present invention generally relates to information technology, and more particularly, to methods and systems for disaster recovery of a network infrastructure to facilitate business continuity.

BACKGROUND

Information technology is the application of computers and telecommunications equipment to store, retrieve, transmit and manipulate data, often in the context of a business or other enterprise. Information technology professionals have recognized for decades the importance of disaster recovery to facilitate business continuity. In information technology, disaster recovery generally involves a series of actions to be taken in the event of major unplanned outages to minimize their adverse effects. For example, there may be instances when computing systems or network infrastructures fail and require recovery or replacement of portions or an entirety thereof due to particular events (e.g., catastrophic events including hacker attacks, computer viruses, electric power failures, underground cable cuts, fire, flood, earthquake, mistakes by administration, etc.).

The related concept of business continuity involves ensuring that an organization's critical business processes, including those utilizing information technology systems, can be maintained in the event of the disaster or catastrophic event. An information technology disaster recovery plan focused on facilitating business continuity typically includes detecting outages or effects of the disaster, notifying affected parties such that the affected parties may take action, isolating the affected systems such that damage cannot spread, and repair and recovery of the critical affected systems such that critical business processes may be resumed.

The repair and recovery of the critically affected systems may include the recovery or replacement of a portion or an entirety of the network infrastructure in order to facilitate the business continuity through the recovery and relocation of computer workloads. For instance, natural disasters, such as a flood or hurricane, may do substantial damage to a computer system or a computer network. If the system is complex, reconstructing the system may be difficult and time consuming.

SUMMARY

In a first aspect of the invention, a method is provide for that includes capturing, by at least one computer device, data and ecology information about an entire existing network infrastructure. The method further includes generating, by the at least one computer device, a generalized descriptive language for the captured data and ecology information. The method further includes reconstructing, by the at least one computer device, the entire existing network infrastructure by introducing functionally equivalent components that correspond to the generalized descriptive language.

In another aspect of the invention, a computer program product is provided for reconstructing an entire network. The computer program product includes a computer usable storage medium having program code embodied in the storage medium. The program code is readable/executable by a computing device to capture data and ecology information about an entire existing network infrastructure. The program code is further readable/executable to transform the captured data and the ecology information into a first generalized descriptive language. The program code is further readable/executable to capture data about a plurality of replacement devices within a recovery inventory transform the captured data about the plurality of replacement devices into a second generalized descriptive language. The program code is further readable/executable to match nodal attributes of the first generalized descriptive language and the second generalized descriptive language to generate a heteromorphic map of a replacement network infrastructure. The program code is further readable/executable to construct the replacement network infrastructure using the heteromorphic map by introducing functionally equivalent components that correspond to the second generalized descriptive language In a further aspect of the invention, a system is provided for that includes a CPU, a computer readable memory and a computer readable storage medium. Additionally, the system includes one or more program instructions. The program instructions are operable to capture capabilities and configuration data from a plurality of target devices on an existing network infrastructure. The program instructions are further operable to generate a generalized descriptive language for the captured capabilities and configuration data. The program instructions are further operable to reconstruct an entirety of the existing network infrastructure by introducing functionally equivalent components that correspond to the generalized descriptive language. The program instructions are stored on the computer readable storage medium for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to information technology, and more particularly, to methods and systems for disaster recovery of a network infrastructure to facilitate business continuity. More specifically, the systems and methods of the present invention construct a network infrastructure that completely replaces an entire failed network infrastructure. Embodiments of the present invention may comprise a discovery phase that allows for capturing hardware and ecology (e.g., the topology and capability of the existing network including the connections between the hardware and control thereof) information of the existing network and the generation of a generalized descriptive language reflective of that information, and a reconstruction phase that reconstructs the entire failed network infrastructure by introducing functional components that correspond to the generalized descriptive language.

More specifically, the systems and methods of the present invention use existing exposed vendor configuration data from devices in an existing network to create a functionally equivalent network in the case of an emergency situation. Unlike traditional systems, aspects of the present invention focus on capturing and managing metadata (e.g., exposed vendor configuration data and/or data about an image comprising the exposed vendor configuration data) about the network infrastructure and environment in which data and messages reside (e.g., the business data and email communications of a client or customer residing and managed by the existing network infrastructure). Accordingly, the network infrastructure and ecology can be reconstructed rapidly using an automated process in the event of a catastrophic failure.

In embodiments, the present invention includes a collecting server configured to gather data over a communications link, which eliminates the need for intrusive technology, and allows for data collection with minimal disruption to a functioning network. Furthermore, embodiments of the present invention use existing vendor supplied management interfaces on existing network devices to provide an automated resiliency network recovery for emergency situations. In particular, in response to an emergency, embodiments of the present invention can provide a customer (e.g., a business) with a functionally equivalent network in a matter of hours.

Advantageously, by implementing embodiments of the present invention it is possible to replace an entire network infrastructure in a short period of time. Also, as discussed herein, significant benefits are obtained by not requiring expensive bulky proprietary software to be installed on each device in the network infrastructure, resulting in a significant reduction in cost for a rapid recovery solution of a network infrastructure. For example, embodiments of the present invention establish a command communications link between the collecting server and a variety of heterogeneous targets in a source network. The collecting server gathers data over the command communications link, eliminating the need for intrusive technology, and allowing for the collection of data with minimal disruption to a working network. By using the existing vendor supplied management interfaces to the existing network devices, an enormous simplification of the programming is possible. In contrast to aspects of the present invention, current vendor solutions do not allow for interoperability of discovery tools in a multi-vendor infrastructure (e.g., across vendor brands). The present invention does not need to put software on devices in the system, thus, the present invention is vendor agnostic (e.g., can cross vendor brands) and does not need to update code as the processes and systems use the vendor's own interface.

In embodiments, program mapping can be carried out using the exposed vendor data. For example, the systems and processes of the present invention focus on nodal capability and requirements creating a standardized expressive language for devices on an existing network and devices available for a recovery network. By focusing on the capabilities and connectivity of these devices, aspects of the present invention are not concerned with duplicating the topology of a failed infrastructure. Instead, the present invention allows for a functional equivalent substitute network to be created on a heteromorphic basis using an available inventory of devices. In other words, the processes and systems of the present invention do not merely map the existing topology but instead use the attributes and binding information obtained from the network devices to construct a functionally equivalent network that is not required to be isomorphic in character. Thus, automation of the recovery process can be employed with minimum effort, despite a heterogenous network ecology, and is suitable for instantiation using automation and other time-saving methods. Consequently, networks can be reconstructed regardless of the original topology or devices available from the original vendors.

Advantageously, the present invention maps the recovery network without the use of cumbersome expensive software at a speed of about 10:1 to 100:1 times faster than traditional methods. For example, trials conducted with an implementation of the present invention show unexpectedly that is it possible to collect the required information in seconds per device, allowing complete network enumeration in a matter of minutes, even on large telecommunications networks. Analysis and provisioning are similarly accelerated, such that preparation and analysis of requirements of large complex networks can be performed three to ten times faster than with existing automation for homogeneous networks. For heterogeneous networks with multiple vendors, the processes and systems of the present invention allow for the processing of requirements using one set of software, to reduce manual collection effort to minimal levels, and providing an increase in the speeds of the provisioning process by at least 50%, in part because multiple tools and data formats no longer need be involved. When compared to traditional diagrammatic methods, the speed improvement results in improvements as high as a 90% reduction in effort and 80% reduction in recovery time.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium and/or device (hereinafter referred to as computer readable storage medium). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
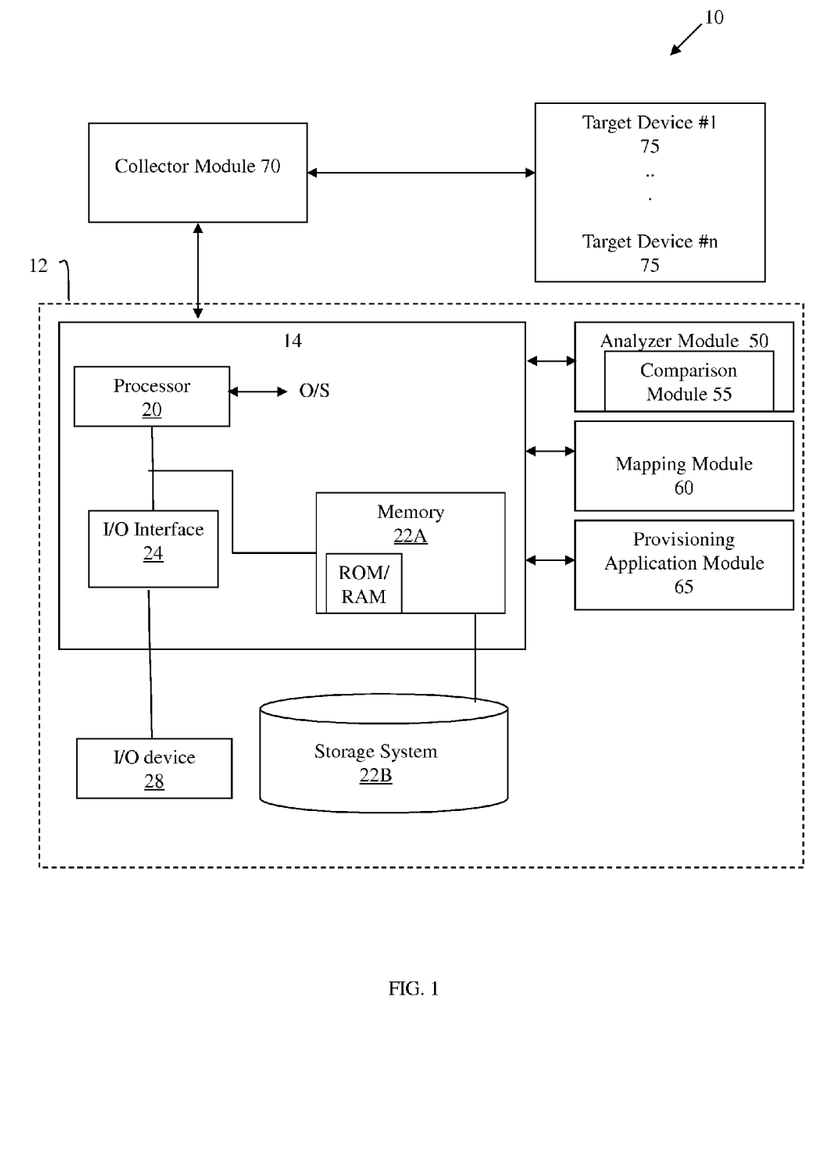
FIG. 1 shows an illustrative environment for implementing the steps in accordance with aspects of the invention.

FIG. 1 shows an illustrative environment 10 for managing the processes in accordance with the invention. To this extent, environment 10 includes a server 12 or other computing system that can perform the processes described herein. In particular, server 12 includes a computing device 14. Computing device 14 can be resident on a network infrastructure or computing device of a third party service provider (any of which is generally represented in FIG. 1).

Computing device 14 also includes a processor 20 (e.g., CPU), memory 22A, an I/O interface 24, and a bus 26. Memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

Computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. External I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the present invention, program control 44 may be configured to control an analyzer module 50, a comparison module 55, a mapping module 60, and a provisioning application module 65, e.g., the processes described herein. Analyzer module 50, comparison module 55, mapping module 60, and provisioning application module 65 can be implemented as one or more program code in program control 44 stored in memory 22A as separate or combined modules. Additionally, analyzer module 50, comparison module 55, mapping module 60, and provisioning application module 65 may be implemented as separate dedicated processors or a single or several processors to provide the function of these tools. While executing the computer program code, processor 20 can read and/or write data to/from memory 22A, storage system 22B, and/or I/O interface 24. The program code executes the processes of the invention. Bus 26 provides a communications link between each of the components in computing device 14.

Computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, environment 10 also may include a collector module 70 configured to collect configuration data from one or more of device(s) 75, e.g., the processes described herein. Collector module 70 can be implemented as one or more program code in a program control stored in memory as separate or combined modules. Additionally, collector module 70 may be implemented as separate dedicated processors or a single or several processors to provide the function of the tool. In embodiments, collector module 70 may be instantiated on a separate computing system or environment remote from computing device 14 (e.g., collector module 70 may be located on a client computing system or environment). Device(s) 75 may include any number of heterogeneous or homogeneous devices (e.g., 1 . . . n) running on a network infrastructure (e.g., a network infrastructure of a client). As should be understood by those of ordinary skill in the art, heterogeneous devices and homogeneous devices refer to whether the target devices are from multiple vendors and/or platforms or whether the target devices are from a same vendor or same platform, respectively.

Figure 2:
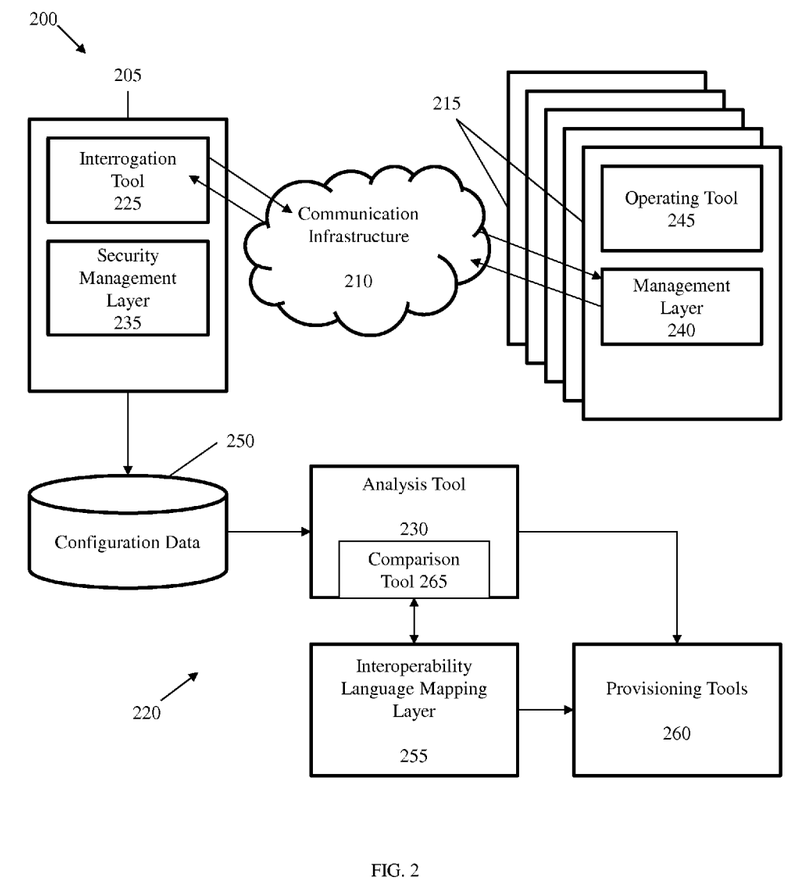
FIG. 2 shows a high level architecture for implementing processes in accordance with aspects of the invention.

FIG. 2 is a high level architecture for implementing processes in accordance with aspects of the present invention. More specifically, FIG. 2 depicts a computing system 200 including a centrally located collector device 205 (e.g., a computing device comprising a collector module 70, as discussed with respect to FIG. 1), a communications infrastructure 210, and one or more target devices 215 (e.g., target devices 75, as discussed above with respect to FIG. 1). In embodiments, collector device 205 may be configured to communicate with the one or more target devices 215 over communications infrastructure 210. For example, collector device 205 may be configured to request configuration information from each of the one or more target devices 215, receive the configuration information from each of the one or more target devices 215, and aggregate the received configuration information. Collector 205 may also be configured to send the aggregated configuration information to a computing system 220 (e.g., a separate computing environment of a service provider comprising the computing device 14, as discussed above with respect to FIG. 1) for further processing.

More specifically, in embodiments, the collector device 205 may be configured to collect configuration data from each of the one or more target devices 215 on an existing network infrastructure (e.g., an existing interconnected group of target devices linked by various parts of telecommunications architecture with a predefined topology). In some embodiments, collector device 205 may reside at a client (e.g., a customer of a service provider). For example, collector device 205 may be located on-site of a network to be recovered. However, as should be understood by one ordinary skill in the art, while collector device 205 is depicted in FIG. 2 at a same location as the one or more target devices 215 on an existing computing system 200, collector 205 may also be maintained at a location of a recovery service provider or a different remote location (not shown in FIG. 2) on a computing system different from computing system 200 comprising the one or more target devices 215.

In embodiments, collector device 205 may include an interrogation tool 225 configured to send interrogation requests to the one or more target devices 215. Interrogation tool 225 can be implemented as one or more program code in a program control stored in memory as separate or combined tools. Additionally, interrogation tool 225 may be implemented as separate dedicated processors or a single or several processors to provide the function of the tool.

In embodiments, the interrogation requests may be configured to communicate with each of the one or more target devices 215 using the target devices' vendor supplied application program interface (API). Specifically, collector device 205 may be configured to communicate to the one or more target devices 215 via interrogation tool 225 using command and control responses of the particular vendor of each of the one or more target devices 215. In accordance with these aspects of the present invention, interrogation tool 225 of collector device 205 may communicate over communications infrastructure 210 to send the interrogation requests to each of the one or more target devices 215 on an existing network infrastructure. In embodiments, communications infrastructure 210 may be provisioned as a local area network (LAN), wide area network (WAN), wireless local area network (WLAN), metropolitan area network (MAN), storage area network (SAN), cloud computing (e.g., a model of service delivery for enabling convenient, on-demand network access to a shared pool of configurable computing resources that can be rapidly provisioned and released with minimal management effort or interaction with a provider of the service), or any combination thereof).

In response to the interrogation requests sent by interrogation tool 225, raw configuration data may be sent by each of the one or more target devices 215 and received by collector device 205. Collector device 205 may be further configured to add header information (e.g., information noting a node from which the raw configuration was retrieved and vendor information pertaining to the node) to the raw configuration data, aggregate all of the responses received from the one or more target devices 215, and send the aggregated responses to an analysis tool 230.

In embodiments, collector device 205 may also include a security management layer 235 for ensuring the secure transmission of data over communications infrastructure 210. For example, security management layer 235 may establish a communications link using file transfer protocol (FTP), secure file transfer protocol (SFTP), multiple firewalls, and/or combinations thereof, and employ known techniques for authentication and encryption, for the secure transmission of data (e.g., the interrogation requests and raw configuration data). In accordance with these aspects of the present invention, security management layer 235 may be configured to manage secure connections between collector device 205 and each of the one or more target devices 215, as well as, between collector device 205 and computing system 220 (e.g., the computing system of the recovery service provider).

Still referring to FIG. 2, the one or more target devices 215 may be configured to receive the interrogation requests from collector device 205 over communications infrastructure 210 (e.g., using a secure connection). Target devices 215 may comprise a variety of heterogeneous targets (e.g., different combinations of vendors, devices, and/or components) or homogeneous targets (e.g., a same vendor or same platform) on an existing network infrastructure (e.g., an existing functioning network). In embodiments, each of the one or more target devices 215 may include a vendor supplied management layer 240 and an operating tool 245. For example, target devices 215 may be configured to receive the interrogation requests from interrogation tool 225 at management layer 240. Management layer 240 may be configured to communicate the interrogation requests to operating tool 245.

In embodiments, operating tool 245 may comprise vendor supplied software, hardware, or combinations thereof (i.e., API) configured to manage the hardware on the corresponding target device 215 and respond to the interrogation requests. For example, operating tool 245 may be configured to respond to the interrogation requests with appropriate capabilities and configuration data (e.g., data about a particular target device including topology information regarding mapping and connections of the device), which may be supplied by the API. Capabilities and configuration data, in this context, may be understood to include attributes of the particular target device and connections the particular device makes (e.g., ecology) to other device of the existing network infrastructure. For example, the API supplied capabilities and configuration data may include, but are not limited to: device vendor identifier, device type and model information, hardware maintenance level, device operating software, devices software level, required bandwidth, protocols employed, nodal connectivity information, security requirements, management techniques, networking properties, etc. The API supplied capabilities and configuration data may be returned by operating tool 245 as raw configuration data to management layer 240, which is configured to forward the raw configuration data over communications infrastructure 210 to the collector device 205 (e.g., over a secure connection).

In embodiments, collector device 205 may be configured to aggregate the raw configuration data received from each of the one or more target devices 215 into a configuration data file 250. Further, the configuration data file 250 may be provided by collector device 205 to computing system 220 (e.g., a computing system operated by a recovery service provider). Computing system 220 may be similar but is not limited to server 12 depicted in FIG. 1. More specifically, computing system 220 may include a combination of analysis tool 230, a interoperability language mapping layer 255, and provisioning tools 260.

In embodiments, analysis tool 230 may be configured to receive configuration data file 250 from collector device 205. Analysis tool 230 may also be configured to identify the vendor and data formats of configuration data file 250 for use by interoperability language mapping layer 255. Thereafter, analysis tool 230 may be configured to forward or send configuration data file 250 with the vendor and data format information to interoperability language mapping layer 255. Analysis tool 230 can be implemented as one or more program code in a program control stored in memory as separate or combined tools. Additionally, analysis tool 230 may be implemented as separate dedicated processors or a single or several processors to provide the function of the tool.

In embodiments, interoperability language mapping layer 255 may be configured to transform configuration data file 250 in order to fulfill the requirements of the new substitute system (e.g., the replacement network infrastructure for the existing network infrastructure in the instance of a catastrophic failure) into a unified uniform specification language (e.g., generalized descriptive language or metadata) using the vendor and data formats. The unified uniform specification language or metadata may comprise data gathered from the one or more target devices 215 via configuration data file 250. For example, the unified uniform specification language may include information about each node, including but not limited to: the type of node, the creator of the node, the adaptors that are available on the node, which adaptors are assigned, the logical boundaries assigned to the adaptor, etc. Accordingly, the unified uniform specification language may be configured to create a topology mapping expressed in a single stylized language across all vendors, suppliers, and all network nodes.

In embodiments, the unified uniform specification language may be created such that the data may be human readable and machine readable by a combination of hardware provisioning applications and software provisioning applications regardless of the vendor or device type. For example, the unified uniform specification language may be expressed in a standardized manner for all supported vendors, independent of vendor proprietary controls, and uniquely binds both topology and capability information. The unified uniform specification language allows for automation to be employed with minimum effort regardless of whether the network ecology is heterogeneous or homogeneous.

In embodiments, the unified uniform specification language may be expressed in a format needed for the provisioning tools to perform their provisioning. The unified uniform specification language may be used by other processes in computer system 220 for creating a functionally equivalent replacement network (e.g., provisioning applications, security checking, etc.). For example, the unified uniform specification language may not merely be expressed through topological information, but may uniquely bind topological information with capability and attribute information in such a manner that automation can be employed with a minimum of effort, despite a heterogeneous network ecology.

Independent of the transformation of configuration data file 250, analysis tool 230 may also be configured to gather capability and configuration data related to available target devices in a recovery inventory (e.g., devices capable of being used to replace target device destroyed in a catastrophic failure), which may be used for provisioning the substitute (reconstructed) network. As should be understood by those of ordinary skill in the art, the capabilities and configuration data of the available recovery inventory may be entered into a central service point, obtained through similar means as the existing network as performed by a collector, or gathered through an alternate process (e.g., from a database). Similar to the transformation of configuration data file 250, the gathered capability and configuration data of the available recovery inventory may be transformed into a unified uniform specification language (e.g., metadata).

In embodiments, analysis tool 230 may be used to aggregate the necessary information to make build specifications for the replacement network. For example, analysis tool 230 may be configured to aggregate a number of device boxes, nodal connections, required row subsets, etc. that are needed to create a functionally equivalent substitute (reconstructed) network. The functionally equivalent substitute network may be designed to replace the entire existing network (e.g., an entire network destroyed in a catastrophic failure) using the unified uniform specification language representations for configuration data file 250 and the available recovery inventory.

More specifically, analysis tool 230 may include a comparison tool 265 that matches the nodal attributes of an existing network to be recovered and the available recovery inventory using the corresponding unified uniform specification language representations. Comparison tool 265 can be implemented as one or more program code in a program control stored in memory as separate or combined tools. Additionally, comparison tool 265 may be implemented as separate dedicated processors or a single or several processors to provide the function of the tool. As would be understood in the art, comparison tool 265 may be a separate module from analysis tool 230 and controlled by the recovery service provider. Comparison tool 265 may perform a sort and merge operation to match the capabilities required to recover the network with the most compatible capabilities available in the recovery inventory. As should be understood by one of ordinary skill in the art, the comparison may be performed through other operations (e.g., performing a manual comparison by a human). In embodiments, the resulting comparison may be formatted in such a manner as to be provided as inputs for provisioning tools 260 (e.g., inputs understood by provisioning tools 260). For example, analysis tool 230 may produce specifications for the internal configuration and attributes required on each target node of the recovery network.

When necessary configuration data is collected and transformed into the unified uniform specification language, a functionally equivalent network may be designed by an automated process to replace a failed existing network. As should be understood by those of ordinary skill in the art, the functionally equivalent replacement network may be a virtual network, a virtual real network, or a physical replacement network provided to the customer. In embodiments, the functionally equivalent network may be designed and implemented by the hardware provisioning applications and software provisioning tools (e.g., provisioning tools 260) using the unified uniform specification language.

For example, processes and systems of the present invention may perform mapping of the replacement network by focusing on nodal capability and requirements using the unified uniform specification language for the existing network and the recovery network. In embodiments, creation of the replacement network may be provisioning tool agnostic (e.g., compatible with any provisioning tool). For example, the unified uniform specification language may be output in any format required as an input for a provisioning application. The unified uniform specification language may be used through direct implementation included as part of the design software or may be used by any existing provisioning software (e.g., Trivoli® Provisioning Manager (TPM), which helps automate software deployment to servers, desktops and laptops distributed across different environments and locations) via appropriate additional transformation software layers.

In embodiments, the unified uniform specification language inputs may be configured to create control information based on the mapping or physical nodes and attribute information for the target devices, and/or create the physical provisioning of the replacement network components. In embodiments, provisioning tools 260 (e.g., hardware provisioning tools) may be configured to map out the hardware components that are necessary to create the replacement hardware for the network, as determined by analysis tool 230 and comparison tool 265. For example, provisioning tools 260 may determine how many of each network box is required to create a functionally equivalent network.

In embodiments, provisioning tools 260 (e.g., software provisioning tools 260) may be further configured to load the required control information, as determined by analysis tool 230 and comparison tool 265, onto provisioned recovery devices. For example, the load of switch control programs may map out how the various cables and connections are required to be connected to create the replacement network. Therefore, provisioning tools 260 are configured to perform all the mapping required to create a functionally equivalent recovery network for a failed network.

Figure 3:
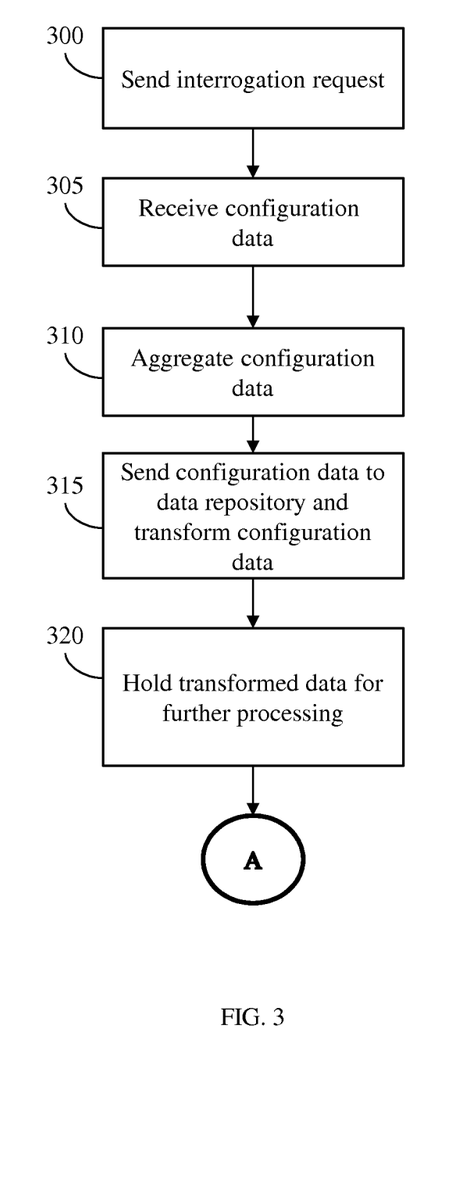
FIGS. 3-5 show exemplary flows in accordance with aspects of the invention.
Figure 4:
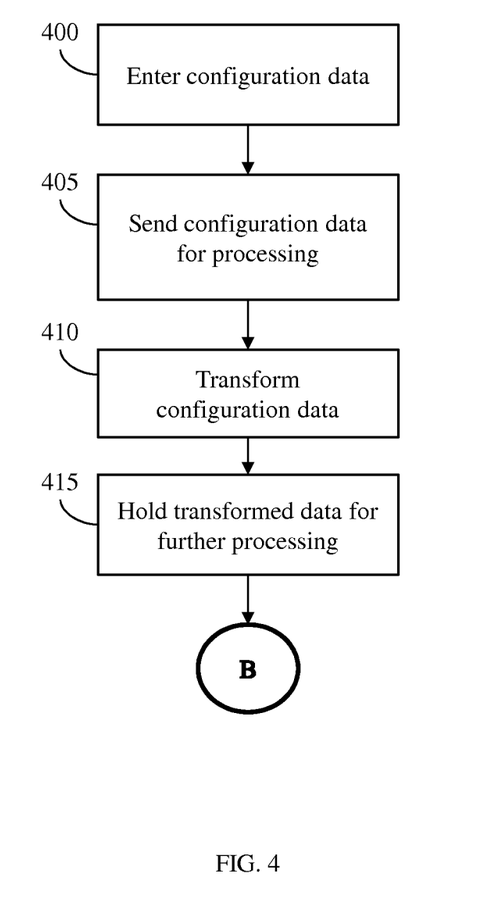
Figure 5:
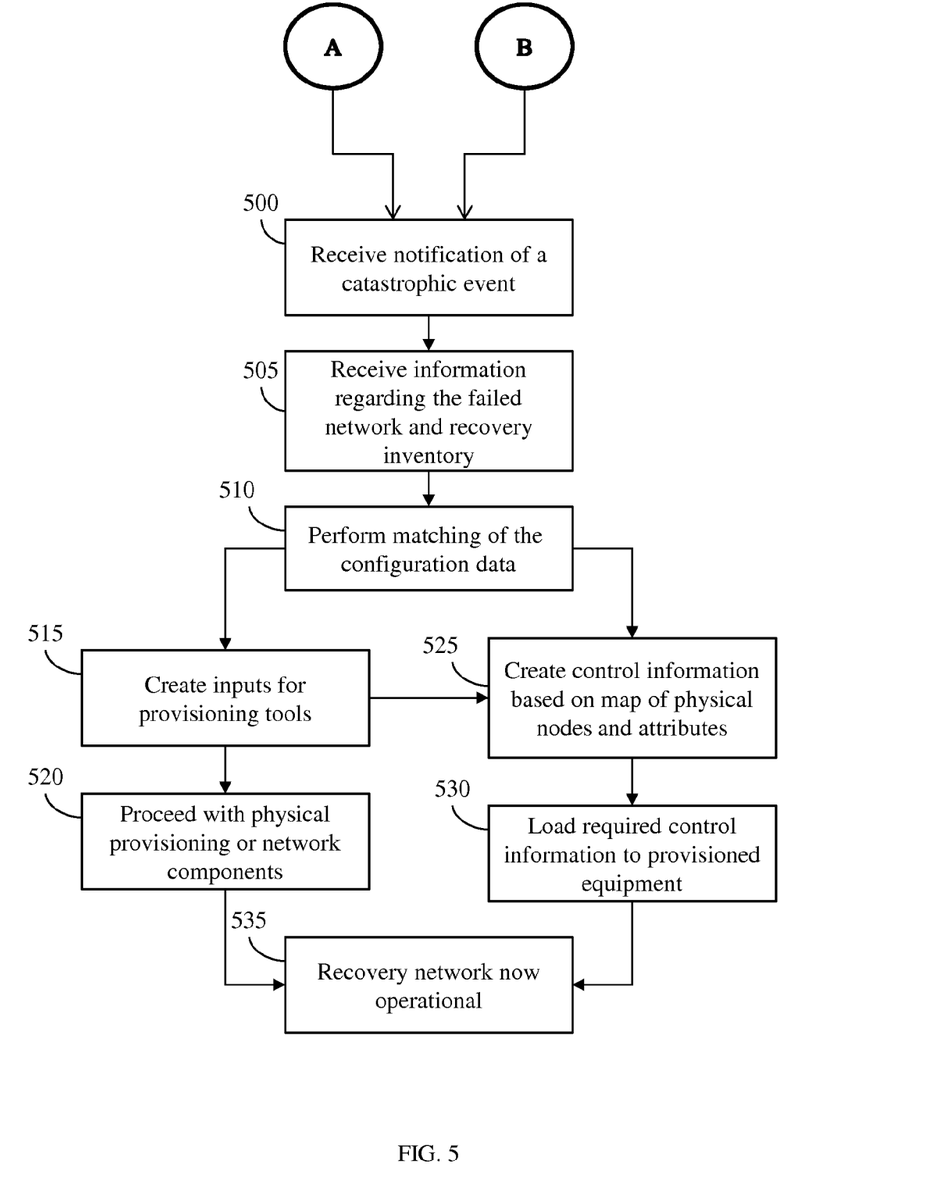

Advantageously, the functionally equivalent network may be vendor neutral and may be created without requiring the same devices/components used in the original recovered network infrastructure. Specifically, the systems and processes of the present invention focus on functional attributes and ecology rather than focusing only on the topology alone as is common in conventional recovery systems. By assessing collected functional attributes of nodes and connections, a homomorphic substitute infrastructure may be constructed by aspects of the present invention without further reference to the original implementation. The replacement or substitute infrastructure will function the same as the network infrastructure that failed, using an available recovery inventory, whether or not the replacement or substitute network infrastructure is identical in topology and/or components to the infrastructure being replaced Flow Diagram FIGS. 3-5 show exemplary flows for performing aspects of the present invention. The steps of FIGS. 3-5 may be implemented in the environments of FIGS. 1 and 2, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 3 depicts an exemplary flow for a process of the discovery phase in accordance with aspects of the present invention. At step 300, interrogation requests may be sent to one or more target devices of an existing network infrastructure (e.g., an existing network infrastructure that a user may be interested in protecting from a catastrophic failure). For example, in embodiments, a collector device (e.g., collector device 205) may be run in a managed network environment (e.g., environment 200), which causes the collector device to interrogate the one or more target devices (e.g. one or more target devices 215) on a running network. The one or more target devices may include a variety of heterogeneous or homogeneous devices.

More specifically, in embodiments, the collector device calls a routine application (e.g., interrogation tool 225) to send interrogation requests on a routine basis. As should be understood by those of ordinary skill in the art, the interrogation requests may be sent periodically, initiated manually, or a custom setup created by a user (e.g., a customer or client). The collector device establishes a command communication link between itself and one or more of the target devices in the target network to send the interrogation requests (e.g., using command and control responses, as discussed above with respect to FIG. 2). For example, the collector device may be configured to gather data over the command communications link, eliminating the need for intrusive technology, allowing collection with minimal disruption of the running network. In particular, the collector device may send an interrogation message to request configuration data and topology information from each of the one or more target devices (e.g., by interrogating the exposed vendor supplied API of the one or more target devices as described above with respect to FIG. 2). For example, the collector may be configured to use command and control responses of the vendors for each of the one or more target devices to communicate with each of the one or more target devices.

In embodiments, the interrogation request may be sent to a management layer (e.g., security management layer 235) of the one or more target devices. The management layer communicates with the operating system (e.g., operating tool 245) of the one or more target device to obtain the requested data. In embodiments, the requested data may include device vendor identifier, device type and model information, hardware maintenance level, device operating software, devices software level, required bandwidth, protocols employed, nodal connectivity information, security requirements, management techniques, networking properties, etc. A response may be returned to the management layer comprising the requested raw configuration.

At step 305, a response to the interrogation requests may be received. For example, in embodiments, a response to the interrogation requests by the collector device may be received from each of the one or more target devices on the network as the raw configuration data. At step 310, the responses comprising the raw configuration data from each of the one or more target devices may be aggregated. For example, in embodiments, the collector device may aggregate the collected data to create an aggregated configuration data file (e.g., configuration data file 250) for all the one or more target devices.

At step 315, the aggregated data or responses may be sent to a repository for further processing including transformation to a unified uniform specification language. For example, in embodiments, the collector device may transmit the aggregated configuration data to a data repository (e.g., a storage system of a recovery service provider configured to store the configuration data file for further processing). In embodiments, further processing may include using a tool (e.g., analysis tool 230) to identify the vendor and data formats and a mapping layer (e.g., interoperability language mapping layer 255) that expresses the raw configuration data as a unified uniform specification language.

More specifically, the unified uniform specification language may be created by the interoperability mapping layer, as described with respect to FIG. 2. In embodiments, the unified uniform specification language may describe topology mapping and node attributes expressed in a single stylized language across all vendors, suppliers, all network nodes. As should be understood by those of ordinary skill in the art, the unified uniform specification language may be output in a format understood by a variety of provisioning applications. At step 320, the unified uniform specification language expression may be held in a repository for further processing as described in relation to FIG. 5 below.

FIG. 4 depicts an exemplary flow for a process of the discovery phase in accordance with aspects of the present invention. In particular, FIG. 4 shows the collection and transformation of information related to devices that are available at a recovery service provider, to be allocated to create a functionally equivalent network to recover a failed network infrastructure (e.g., recovery inventory). The process starts at step 400, where configuration information may be gathered for each device available in the recovery inventory. As should be understood by those of ordinary skill in the art, the gathered recovery inventory configuration information may be entered manually, through a similar process performed in FIG. 3, or through an alternate automated process.

At step 405, the recovery inventory configuration information may be sent for processing. For example, the recovery inventory configuration information may be sent to the interoperability language mapping layer for processing. At step 410, the available recovery inventory configuration information may be processed including being transformed into a series of statements in an expressive language (e.g., the unified uniform specification language), through a similar process described with respect to FIGS. 2 and 3. At step 415, the unified uniform specification language expression may be held in a repository for further processing as described in relation to FIG. 5 below.

FIG. 5 depicts an exemplary flow for a process of the reconstruction phase in accordance with aspects of the present invention. In particular, FIG. 5 shows a process in which the unified uniform specification language generated in FIGS. 3 and 4 may be used to recover a failed network infrastructure. The process starts at step 500, where a notification is received for a catastrophic event on an existing network infrastructure. For example, a recovery service provider may be notified by a customer indicating that a catastrophic event has occurred at a customer's existing network infrastructure. As should be understood in the art, although this embodiment depicts a customer contacting a recovery service provider for notification of a catastrophic event, this notification may be done automatically (e.g., using monitoring software).

At step 505, the information that has been held for processing in FIGS. 3 and 4 may be retrieved. For example, the unified uniform specification language for the failed network infrastructure and the unified uniform specification language for the recovery inventory may be retrieved from the repository. In embodiments, the information may be supplied or retrieved a matching tool (e.g., comparison tool 265 depicted in FIG. 2) configured to perform matching process between the different pieces of information (e.g., the information retrieved from processes of FIG. 3 and the information retrieved from the processes of FIG. 4).

At step 510, a matching process matches the capabilities required (e.g., the target device information) and the capabilities of the available recovery inventory (e.g., the available recovery inventory configuration information), as discussed with respect to FIG. 2. In embodiments, the matching process may generate input results for tools configured to create hardware and control information inputs for various provisioning applications (e.g., provisioning tools 260).

At step 515, the results of the matching process may be formatted to provide an acceptable input required for provisioning tools. In embodiments, once the inputs have been formatted they may be forwarded to the hardware and software provisioning tools for processing.

At step 520, the network components from the available recovery inventory necessary for creating the hardware for the recovery network infrastructure are provisioned. For example, hardware provisioning tools may provision the network components from the available recovery inventory in order to provide a replacement or substitute network infrastructure for the failed network infrastructure. In embodiments, the devices from the recovery inventory that were determined to be most compatible by the matching process are allocated for the replacement or substitute network infrastructure.

At step 525, control components necessary for recreating the functionality the failed network infrastructure are provisioned. For example, software provisioning tools may create control information based on the mapping of physical nodes and attributes from the failed network infrasturcture, as discussed with respect to FIG. 2.

At step 530, the required control information that was provisioned at step 525 may be installed or loaded on the hardware devices provisioned in step 520. For example, this may be accomplished by uploading the controls to the hardware and reconfiguring the hardware to operate using the control information. At step 535, the process is complete and a functionally equivalent recovery network is fully operational as a replacement or substitute for the failed network. As should be understood by those of ordinary skill in the art, the functionally equivalent recovery network operates with the same functionality as the failed network but does not necessarily share the same topology and/or device composition of the failed network.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    capturing, by at least one computer device, data and ecology information about an entire existing network infrastructure;
    generating, by the at least one computer device, a first generalized descriptive language for the captured data and ecology information;
    capturing, by the at least one computer device, data about a plurality of replacement devices within a recovery inventory;
    generating, by the at least one computer device, a second generalized descriptive language for the captured data about the plurality of replacement devices;
    matching nodal attributes of the first generalized descriptive language and the second generalized descriptive language to generate a heteromorphic map of a replacement network infrastructure; and
    reconstructing, by the at least one computer device, the entire existing network infrastructure using the heteromorphic map by introducing functionally equivalent hardware components that correspond to the second generalized descriptive language.

2. The method of claim 1, wherein the capturing the data and the ecology information comprises sending an interrogation request to each of a plurality of target devices residing on the existing network infrastructure.

3. The method of claim 2, wherein the capturing the data and the ecology information further comprises receiving the data and the ecology information from each of the plurality of target devices.

4. The method of claim 3, wherein the data and the ecology information comprise capabilities and configuration data for each of the plurality of target devices.

5. The method of claim 4, wherein the capabilities and the configuration data comprise at least one of: device vendor identifiers, device type and model information, hardware maintenance level, device operating software, device software level, required bandwidth, protocols employed, nodal connectivity information, security requirements, management techniques, and networking properties.

6. The method of claim 4, wherein the capturing the data and the ecology information further comprises aggregating the capabilities and the configuration data received for each of the plurality of target devices.

7. The method of claim 1, wherein the captured data about the plurality of replacement devices includes capabilities and configuration data for each of the plurality of replacement devices.

8. The method of claim 1, wherein the reconstructing the entire existing network infrastructure comprises receiving notification of a catastrophic event that causes the entire existing network infrastructure to fail.

9. The method of claim 1, wherein the reconstructing the entire existing network infrastructure further comprises creating inputs for provisioning tools based on the first generalized descriptive language for the captured data and the ecology information of the existing network infrastructure and the second generalized descriptive language for the determined functionally equivalent replacement devices.

10. The method of claim 9, wherein the reconstructing the entire existing network infrastructure further comprises provisioning hardware of the determined functionally equivalent replacement devices.

11. The method of claim 10, wherein the reconstructing the entire existing network infrastructure further comprises provisioning software on the hardware of the determined functionally equivalent replacement devices.

12. A computer program product for reconstructing an entire network, the computer program product comprising a computer readable hardware storage device having program code embodied in the storage device, the program code readable/executable by a computing device to:
    capture data and ecology information about an entire existing network infrastructure;
    transform the captured data and the ecology information into a first generalized descriptive language;
    capture data about a plurality of replacement devices within a recovery inventory;
    transform the captured data about the plurality of replacement devices into a second generalized descriptive language;
    matching nodal attributes of the first generalized descriptive language and the second generalized descriptive language to generate a heteromorphic map of a replacement network infrastructure; and
    construct the replacement network infrastructure using the heteromorphic map by introducing functionally equivalent hardware components that correspond to the second generalized descriptive language.

13. A system comprising:
    a CPU, a computer readable memory and a computer readable storage medium;
    program instructions to capture data and ecology information about an entire existing network infrastructure;
    program instructions to generate a first generalized descriptive language for the captured data and ecology information;
    program instructions to capture capabilities and configuration data from a plurality of target devices on an existing network infrastructure;

program instructions to generate a second generalized descriptive language for the captured capabilities and configuration data;

program instructions to match nodal attributes of the first generalized descriptive language and the second generalized descriptive language to generate a heteromophic map of a replacement network infrastructure; and program instructions to reconstruct an entirety of the existing network infrastructure using the heteromorphic map by introducing functionally equivalent hardware components that correspond to the second generalized descriptive language, wherein the program instructions are stored on the computer readable storage medium for execution by the CPU via the computer readable memory.

14. The system of claim 13, wherein the capturing the capabilities and configuration data comprises sending an interrogation request to each of the plurality of target devices on the existing network infrastructure.

15. The system of claim 14, wherein the capturing the capabilities and configuration data further comprises aggregating the capabilities and the configuration data received for each of the plurality of target devices.

16. The system of claim 13, wherein the reconstructing the entirety of the existing network infrastructure further comprises:
provisioning hardware of the determined functionally equivalent components; and
provisioning software on the hardware of the determined functionally equivalent components.

* * * * *